United States Patent
Freier et al.

(10) Patent No.: US 8,860,382 B2
(45) Date of Patent: Oct. 14, 2014

(54) METHOD FOR DAMPING TORSIONAL OSCILLATIONS IN A DRIVE TRAIN COMPONENT

(71) Applicant: Robert Bosch GmbH, Stuttgart (DE)

(72) Inventors: Christian Freier, Zellingen (DE); Andreas Vath, Leidersbach (DE); Sebastian Grimm, Wuerzburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/903,616

(22) Filed: May 28, 2013

(65) Prior Publication Data

US 2013/0320935 A1  Dec. 5, 2013

(30) Foreign Application Priority Data

May 29, 2012 (DE) .......................... 10 2012 010 420

(51) Int. Cl.
*H02P 11/00* (2006.01)
(52) U.S. Cl.
USPC ............................................. 322/36; 290/44
(58) Field of Classification Search
USPC ................... 322/24, 36, 44; 290/44
See application file for complete search history.

(56) References Cited

U.S. PATENT DOCUMENTS

| | | | |
|---|---|---|---|
| 7,518,344 B2* | 4/2009 | Sihler ............................. | 322/58 |
| 7,808,215 B2* | 10/2010 | Markunas et al. .............. | 322/44 |
| 7,884,581 B2* | 2/2011 | Markunas et al. .............. | 322/44 |
| 7,939,956 B1* | 5/2011 | Larsen ........................... | 290/44 |
| 8,169,197 B2* | 5/2012 | Rittiger ........................... | 322/24 |
| 8,217,630 B2* | 7/2012 | Markunas et al. .............. | 322/36 |
| 8,299,643 B2* | 10/2012 | Wakasa et al. .................. | 290/44 |
| 8,476,779 B2* | 7/2013 | Castell Martinez et al. .... | 290/44 |
| 8,536,839 B2* | 9/2013 | Hobelsberger et al. ......... | 322/99 |
| 8,593,006 B2* | 11/2013 | Wohlleb .......................... | 290/44 |
| 2008/0067815 A1 | 3/2008 | Suryanarayanan et al. | |

FOREIGN PATENT DOCUMENTS

DE  10 2007 019 907 B4  4/2009
DE  10 2009 059 669 A1  6/2011

* cited by examiner

*Primary Examiner* — Nicholas Ponomarenko
(74) *Attorney, Agent, or Firm* — Maginot, Moore & Beck

(57) ABSTRACT

A method for damping torsional oscillations in a drive train component, in particular a gearbox, in particular in a power production plant, includes adjusting a load on the output side in the drive train as a function of a difference between a rotational speed of an input shaft of the drive train component and a rotational speed of an output shaft of the drive train component.

17 Claims, 1 Drawing Sheet

US 8,860,382 B2

METHOD FOR DAMPING TORSIONAL OSCILLATIONS IN A DRIVE TRAIN COMPONENT

This application claims priority under 35 U.S.C. §119 to patent application no. DE 10 2012 010 420.0, filed on May 29, 2012 in Germany, the disclosure of which is incorporated herein by reference in its entirety.

BACKGROUND

The present disclosure relates to a method for damping torsional oscillations in a drive train component, in particular a power production plant, and to a computing unit for the implementation thereof.

Drive trains, comprising components such as gearboxes, clutches and connecting elements (shafts), are important constituent parts, amongst others, of various electrical power production plants, such as wind power plants, water power plants, etc. The drive train fulfills the task of producing a mechanical connection between a drive (for example a rotor of a wind power plant) and an output (for example an appropriate generator), via which energy is transmitted via a rotational movement. Drive train components, such as gearboxes, are used to transform the rotational speed and the torque which are present on the drive into values which correspond to the working range of the generator. Clutches are used as required for separation between drive and output, and shafts produce the mechanical connection between the components involved. In addition, further components, such as mechanical brakes or the like, can be integrated in the drive train.

Since the components involved cannot be fabricated as rigidly as desired but have a finite rigidity, they can be excited into natural oscillations. Such an excitation can be carried out, for example, by a non-constant input power (in the case of wind power plants, for example as a result of gusts or wind turbulence), by external interference or by inherent movements of other plant components. In addition, oscillations of another origin can result in oscillations in the drive train; in the case of a wind power plant, for example, tower oscillations or oscillations on account of the tooth engagements of a gearbox.

Oscillations have a detrimental effect on the service life of the components involved, in particular the gearbox. Continuous threshold loads increase the wear of the affected components and lead to shorter replacement intervals, which represents a financial and technical burden on the plant and network operator and reduces the plant income. In particular from the point of view of the expected increase in the wide spread of wind power plants in the offshore sector in the foreseeable future, this aspect plays an ever greater role, since the replacement of damaged components is made more difficult there. The result is therefore the objective of reducing these oscillations in order to increase the service life of the components.

In order to avoid oscillations, use can be made of generators, the load of which is adjustable. The generator can be, for example, a double-fed asynchronous generator, which on the stator side is connected directly to the network and on the generator rotor side is supplied via an intermediate DC circuit, by which means voltages and currents of different frequency and amplitude can be impressed on the generator rotor. In addition, synchronous generators which are connected to the network via inverters with intermediate DC circuit and are accordingly adjustable are used in the prior art. By means of the aforementioned actuating possibilities, the generator can be predefined a moment which is matched to the damaging oscillations, by which means it reduces the latter and appropriately damps the torsional moment present in the drive train.

For instance, a method is known from DE 10 2007 019 907 B4 which, by using the generator rotational speed, forms a control difference via a retardation element that is capable of oscillation, from which a corrective moment for generator control is determined.

A similar approach is followed in US 2008/0067815, according to which a signal is generated from changes in the generator rotational speed, by means of which damping is implemented via the generator actuating torque.

It is to be viewed as disadvantageous in these solutions that the damaging oscillations of the torsional moment are determined with only restricted accuracy and, accordingly, the quality of the compensating operations is also limited. In particular, the determination of the oscillations from the rotational speed is afflicted with considerable inaccuracies.

DE 10 2009 059 669 A1 describes determining and damping the torsional moment prevailing in the drive train from an angular difference between rotor and generator position. For this purpose, however, the rigidity of the drive train must be known very accurately.

It is therefore desirable to damp torsional oscillations in a drive train component as simply and effectively as possible.

SUMMARY

A method having the features of the disclosure is proposed. Advantageous refinements are the subject matter of the subclaims and of the following description.

Although the present disclosure will primarily be described in relation to wind power plants in the context of this application, it is in no way restricted to wind power plants or equipment for energy production but, in principle, can be employed in all devices in which torsional oscillations of shafts, axles and the like, in particular including shafts and axles with interposed gearboxes, can occur.

Within the context of the disclosure, a possible way is presented as to how torsional oscillations in a drive train component can be damped simply and effectively. The disclosure manages particularly advantageously with simple rotational speed measurements, for which purpose sensors are present in any case in most plants or can easily be retro-fitted. A rigidity does not have to be known. The solution is robust with respect to uncertainties in the mathematical model of the drive train.

By changing a load on the output side, the rotational speed difference between input shaft and output shaft of the drive train component, in particular a gearbox, is regulated to a set point, in particular to zero (given a transmission ratio of 1 or given normalization of the measured rotational speeds with the transmission ratio) or to a value corresponding to the transmission ratio of the gearbox. A control loop is expediently formed with the rotational speed difference as controlled variable and an additive load value for the load on the output side as control variable.

The rotational speed difference can be measured particularly simply, which opens up particular advantages. Firstly, oscillations are measured over the entire drive train component, by which means they can be damped effectively by actions on the load. Secondly, the rotational speed difference constitutes a variable that is proportional to the time derivative of the torsional moment, for which reason additional differentiation of the measured signal for reasons of faster controller reaction (as is widespread in the prior art) is not required. The disadvantage of subsequent differentiation of the measured signal lies in the unavoidable amplification of measurement noise, which has a negative effect on the quality of the generated actuating signal and thus on the control quality.

A controller suitable for the disclosure can advantageously be implemented by means of a simple proportional controller ("P controller"). Further advantageously, additional rotational speed-adaptive and non-adaptive filters are used, which lead to a considerable improvement in the control quality. In particular, exciting tooth engagement frequencies from the tooth contact in the drive train component can be filtered out thereby, which otherwise would likewise be amplified, which would lead to high-frequency variations in moment at the generator and thus also to high-frequency fluctuations in an output produced by the generator. Advantageous filters are in particular notch filters, that is to say narrow-band blocking filters, the blocking frequency of which is adapted to a multiple of a measured rotational speed in the drive train. The respective multiple is expediently determined in accordance with the tooth engagement frequencies occurring in the drive train component, for example gearbox.

In further embodiments, instead of the rotational speed difference, an acceleration difference can also be measured and the rotational speed difference determined by integration. In this case, it is recommended to fit at least two sensors at the respective measuring location, for example on the gearbox input side on the main shaft of the wind power plant, in order to compensate for interference signals, such as gravitation or flexural oscillations, and thus make them invisible to the control.

Although the disclosure will be described substantially with reference to rotational speeds, it is also suitable in the same way for torsional moments or differences therein. In particular, the measurement of torsional moments, for example by means of strain gauges, can advantageously be employed here. It is conceivable to form a torsional moment or a difference in the torsional moment at the gearbox input and at the gearbox output and to provide the same to the controller.

A number of possibilities for acquiring measured signals are available. In energy production plants, as a rule the rotational speed on the input and/or the output side is known. On the drive side, for example in the case of the rotor of a variable rotational-speed wind power plant, it is picked up by rotational speed transmitters and transmitted to the plant controller which, on the basis of this value, controls or regulates the operation of the plant. On the generator side, the rotational speed can be derived from electrical variables in the generator, if it is not likewise determined by a rotational speed transmitter. In some plants, it is usual to determine the rotational speed only on the generator side and to feed it into the plant control or regulation.

Within the context of this application, "rotor" designates the part of a power production plant acted on and driven by water or wind, for example. The mobile part of the generator, on the other hand, will be designated by the term "generator rotor".

If the load on the output side is a generator, the generator rotational speed can be used as the rotational speed of the output shaft, which can be measured via a rotary encoder that is in any case present on the generator. The advantage here resides in the subsequent very simple design of the controller used, since it is then what is known as a collocated system, which means that the location of the measurement and of the actuating intervention are identical. As a result, given proportional measured signal feedback and disregarding time delays between measurement and actuating variable action, a stable closed control loop is always produced.

If the evaluation of the rotary encoder on the generator is not considered or if no such rotary encoder is present, then the rotational speed of the output shaft can be determined directly by additional sensors. It should be noted that the clutch and brake disk frequently present between output and generator shaft in power production plants can then have a considerable influence on the system dynamics. They should therefore expediently be taken into account in the controller design if they cause additional natural frequencies in the region of the controller bandwidth. Then, on account of the different locations of measured signal and actuating signal, one speaks of a non-collocated system, which no longer guarantees a stable control behavior for simple controllers. In these cases, it is advantageous to use model-based controllers, since the latter can also take these effects into account. The mathematical model needed for this purpose can be obtained either on the basis of a theoretical derivation, a system identification by using measured signals or from multiple-body simulations. The combination of such model-forming methods is also possible.

Furthermore, the alternative of using sensors that are present is recommended, in order to draw conclusions about accelerations or torsional moments on the rotor side or gearbox input side.

For the accelerations, for example, it is possible to fall back on acceleration sensors in pods or control devices of pitch systems in the rotor hub. The advantage here is that such systems are normally integrated for safety reasons and are thus already redundant, therefore available in a multiple implementation. It is then possible to draw conclusions about the rotor rotational speed by means of integration from the rotor acceleration determined.

A computing unit according to the disclosure, for example a control device of a power production plant, is designed, in particular by programming, to carry out a method according to the disclosure. The computing unit, as a device for measured signal processing and controller signal generation, is in particular designed to set a load in a drive train as a function of a difference between a rotational speed of the input shaft and a rotational speed of the output shaft, in particular by means of appropriately driving an electrical generator.

As an integrated embodiment for the damping concept proposed, a gearbox equipped with acceleration, rotational speed and/or torsional moment sensors is proposed which, together with such a computing unit, adapts itself intelligently to the environment, for example the wind power plant, and provides actuating signals for the generator torque and also further possible actuators in the wind power plant, in order to reduce oscillations which can reduce the service life of the gearbox.

Further advantages and refinements of the disclosure can be gathered from the description and the appended drawing.

It goes without saying that the features mentioned above and those still to be explained below can be used not only in the respectively indicated combination but also in other combinations or on their own without departing from the scope of the present disclosure.

BRIEF DESCRIPTION OF THE DRAWINGS

The disclosure is illustrated schematically in the drawing by using an exemplary embodiment and will be described extensively below with reference to the drawing.

DETAILED DESCRIPTION

Figure 1:
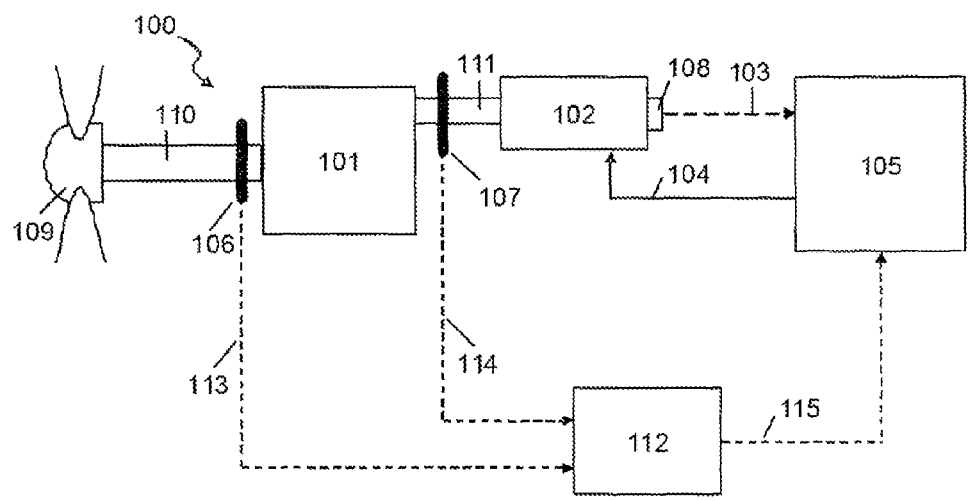
FIG. 1 shows a first preferred embodiment of a wind power plant according to the disclosure.
Figure 2:
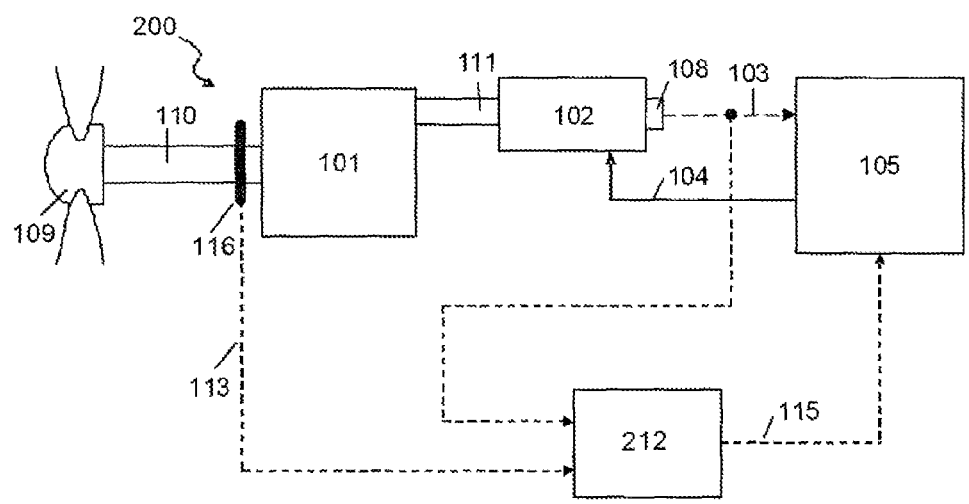
FIG. 2 shows a second preferred embodiment of a wind power plant according to the disclosure.

In FIGS. 1 and 2, identical elements are designated by identical reference numbers. In each case, a preferred embodiment of a wind power plant according to the disclosure is illustrated schematically in a block diagram and designated overall by 100 and, respectively, 200.

Illustrated are a rotor 109 and a generator 102 of a wind power plant 100, 200, which are connected to one another mechanically by a drive train comprising a rotor output shaft 110, a gearbox 101, a shaft 111, possibly with clutch. The rotor is fitted to a rotor-side end of the drive train, the generator to a generator-side end. The generator 102 is equipped with a rotational speed sensor 108 (rotary encoder), which measures the generator rotational speed 103 and transmits it to a computing unit 105, which is designed for the control of the wind power plant and will therefore be designated "plant control system". The plant control system 105 is designed to influence the power uptake of the generator 102 via actuating signals 104 which, in particular, appropriately activate an inverter and/or a generator rotor of the generator.

In FIG. 1, a first sensor 106 is arranged on the input side of the gearbox and a second sensor 107 is arranged on the output side, each of which acquires a measured signal 113, 114 (in particular a series of measured values) and transmits them to a damping control system 112, in which an action 115 for the generator 102 is determined and transmitted to the plant control system 105. In particular, by using the acquired measured signals 113 and 114, an additive actuating moment 115 for the generator is calculated as an action in the damping control system 112 and transmitted to the plant control system 105. The latter superimposes the additive actuating moment on a load moment set point of the generator. The load moment set point of the generator can originate, for example, from an output and/or rotational speed control system, which can be implemented in wind power plants. It should be pointed out that the damping control system 112 can be implemented in an embodiment as part of the plant control system 105. The measured signals 113 and 114 are preferably rotational speed signals but can also be acceleration signals or torsional moment signals.

The damping control system 112 is designed, whilst taking into account a transmission ratio of the gearbox 101, to determine a rotational speed difference between the rotational speed 113 of the rotor output shaft 110, as input shaft of the gearbox 101, and the rotational speed 114 of the shaft 111, as output shaft of the gearbox 101. "Whilst taking into account a transmission ratio" means that the rotational speed difference is theoretically zero. The damping controller 112 is further designed to control this rotational speed difference to a set point which is preferably zero. This is because it can be assumed that torsional oscillations over the gearbox are minimal if there is no rotational speed difference. In this way, a torsional oscillation can be damped via a drive train component, such as the gearbox here. The design of the damping controller in this case is preferably carried out in accordance with the approach for non-collocated systems and, for example, has a model-based controller. Instead of the rotational speed difference, a measured torsional moment difference or an individual measured torsional moment can also be regulated to zero.

In FIG. 2, a wind power plant 200 is shown in which there is no sensor on the shaft 111. Instead, the generator rotational speed 103 is fed to the damping controller 212.

The damping controller 212 is now designed, whilst taking into account the transmission ratios involved, to determine a rotational speed difference between the rotational speed 113 of the rotor output shaft 110, as input shaft of the gearbox 101, and the rotational speed 103 of the generator 102, so to speak as output shaft of the gearbox 101. The damping controller 212 is further designed to regulate this rotational speed difference to a set point, which is preferably zero. This is because it can be assumed that torsional oscillations between gearbox input shaft and generator shaft are minimal when there is no rotational speed difference. In this way, a torsional oscillation can be damped via a drive train component, such as here the gearbox together with the generator shaft. In this case, the design of the damping controller is preferably carried out in accordance with the approach for collocated systems and, for example, has a P controller.

What is claimed is:

1. A method for damping torsional oscillations in a drive train component of a drive train, the drive train component having an input shaft and an output shaft, the method comprising:
adjusting a load on an output side in the drive train as a function of a difference between a rotational speed of the input shaft and a rotational speed of the output shaft.

2. The method according to claim 1, wherein the rotational speed difference is regulated to a set point by adjusting the load on the output side.

3. The method according to claim 2, wherein the rotational speed difference is determined while considering a transmission ratio, the set point being zero.

4. The method according claim 1, wherein one or more of the rotational speed of the input shaft and the rotational speed of the output shaft are measured.

5. The method according to claim 1, wherein one or more of an acceleration of the input shaft and an acceleration of the output shaft are measured.

6. The method according to claim 5, wherein one or more of the acceleration of the input shaft is measured by at least two sensors and the acceleration of the output shaft is measured by at least two sensors.

7. The method according to claim 1, wherein the load is adjusted as a function of a difference between a torsional moment of the input shaft and a torsional moment of the output shaft instead of the load being adjusted as a function of the difference between the rotational speeds of the input shaft and the output shaft.

8. The method according claim 1, wherein a band blocking filter is used, the blocking frequency of which is set as a function of a measured rotational speed in the drive train.

9. The method according to claim 1, wherein a load moment of a generator is adjusted as output-side load.

10. The method according to claim 9, wherein an additive actuating moment for the load moment is adjusted.

11. The method according to claim 1, wherein the drive train component is a gearbox in a power production plant.

12. The method according to claim 4, wherein the one or more of the rotational speed of the input shaft and the rotational speed of the output shaft are measured by sensors.

13. The method according to claim 5, wherein the one or more of the acceleration of the input shaft and the acceleration of the output shaft are measured by sensors.

14. The method according to claim 8, wherein the band blocking filter is a notch filter.

15. A computing unit configured to implement a method for damping torsional oscillations in a drive train component of a drive train, the drive train component having an input shaft and an output shaft, the method comprising:

adjusting a load on an output side in the drive train as a function of a difference between a rotational speed of the input shaft and a rotational speed of the output shaft.

16. A drive train component, comprising:
an input shaft and an output shaft;
one or more of a first sensor configured to measure a rotational speed, an acceleration, or a torsional moment of the input shaft and a second sensor configured to measure a rotational speed, an acceleration, or a torsional moment of the output shaft; and
a computing unit configured to implement a method for damping torsional oscillations in the drive train, the method comprising:
  adjusting a load on an output side in the drive train as a function of a difference between the rotational speed of the input shaft and the rotational speed of the output shaft.

17. The drive train component according to claim 16, wherein the drive train component is for a wind power plant.

* * * * *